United States Patent [19]

Gormley et al.

[11] Patent Number: 4,984,480
[45] Date of Patent: Jan. 15, 1991

[54] ROLLING ROTOR MOTOR BALANCING MEANS

[75] Inventors: Thomas P. Gormley, St. Louis, Mo.; James F. Crofoot, Kirkville, N.Y.

[73] Assignee: Carrier Corporation, Syracuse, N.Y.

[21] Appl. No.: 450,495

[22] Filed: Dec. 14, 1989

[51] Int. Cl.$^5$ .......................... F16F 15/22; H02K 5/24
[52] U.S. Cl. ..................................... 74/573 R; 74/572; 310/51
[58] Field of Search ............. 310/51 X, 67 R; 74/572, 74/573 R, 574; 417/354

[56] References Cited

U.S. PATENT DOCUMENTS

| | | | |
|---|---|---|---|
| 2,089,626 | 8/1937 | Smith | 74/573 R |
| 3,022,433 | 2/1962 | Ferranti | 74/572 X |
| 3,574,325 | 4/1971 | Agarwal | 74/572 X |
| 3,662,619 | 5/1972 | Seeliger | 74/572 |
| 3,691,413 | 9/1972 | Russell | 74/572 X |
| 4,021,086 | 5/1977 | Rajsigl | 74/572 X |
| 4,086,506 | 4/1978 | Kustom et al. | 74/572 X |
| 4,617,484 | 10/1986 | Buijsen | 310/51 |
| 4,647,803 | 3/1987 | von der Heide et al. | 310/67 R X |
| 4,783,608 | 11/1988 | Gruber et al. | 310/51 X |
| 4,819,502 | 4/1989 | Nakajima et al. | 74/572 |
| 4,833,353 | 5/1989 | Hansen | 310/51 |

FOREIGN PATENT DOCUMENTS

| | | | |
|---|---|---|---|
| 3008430 | 9/1981 | Fed. Rep. of Germany | 310/51 |
| 0188351 | 10/1984 | Japan | 310/51 |

Primary Examiner—Vinh T. Luong
Attorney, Agent, or Firm—David J. Zobkiw

[57] ABSTRACT

The center of gravity of the rotor of a rolling rotor motor and the center of gravity of the counterweights are located on diametrically opposite sides of the centerline of the stator. The rotor and counterweights are connected through a plurality of circumferentially spaced links which are pivotable about fixed axes. The rotor and counterweights are able to move radially to change their rotation arm but such movement is transmitted to the other member through the links resulting in a corresponding movement.

10 Claims, 6 Drawing Sheets

ON AT OFF

ON BEFORE OFF

ROLLING ROTOR MOTOR BALANCING MEANS

BACKGROUND OF THE INVENTION

A rolling rotor motor is one in which only a portion of the windings are activated at any given time and the resultant asymmetric magnetic field is moved around the stator by changing which ones of the windings are the activated windings. This type of motor is characterized by high torque and low speed. Where the rotor is located internally of the stator, the coaction between the rotor and stator as a result of the asymmetric magnetic field, unless otherwise limited, is like that of the piston and cylinder of a rolling piston or reciprocating vane type compressor. As a result, the rotor may also be the piston of a rolling piston compressor such as is disclosed in U.S. Pat. No. 2,561,890. Since the rotor rolls around in contact with the stator, there are low bearing loads as compared to a motor in which the rotor is constrained to rotate about a fixed axis.

The rolling rotor motor can be integral with the compressor thereby reducing the size and number of parts such as shafts and bearings, but it has some inherent disadvantages. Because only some of the windings are activated at any particular time, the horsepower per pound of motor weight is less than it would be for an induction motor. Also, the rotor is dynamically unbalanced since its center traces a circular orbit as it moves circumferentially towards the activated windings due to magnetic attraction as it follows the rotating field while points on the rotor go through a hypocycloid motion. The unbalance forces increase with the square of the rotor speed thus making the motor unsuitable for high speed applications.

SUMMARY OF THE INVENTION

An extension is provided on each end of the rolling rotor and these extensions coact through pivoted links with counterweights. This coaction serves to constrain the counterweights so that their masses are always located diametrically opposite the rotor mass relative to the center line of the stator. The links drive each of the counterweights so that the counterweights maintain angular alignment. However, the rotor is free to change its radius of operation such as rolling over foreign material on the inside of the rotor.

It is an object of this invention to dynamically balance a rolling rotor motor.

It is another object of this invention to provide counterbalance weights which are simple to apply and which do not restrict the action of the rolling rotor.

It is a further object of this invention to permit the rolling rotor to change its radius of operation. These objects, and others as will become apparent hereinafter, are accomplished by the present invention.

Basically, the center of the rotor of a rolling rotor motor and the centers of two counterweights are located on diametrically opposite sides of the centerline of the stator. The rotor and counterweights are able to move radially to change their rotation arm and thereby accommodate foreign/incompressible material at the point of contact between the rotor and stator. The rotor and the two counterweights are connected through a plurality of circumferentially spaced links which are pivotable about fixed axes.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
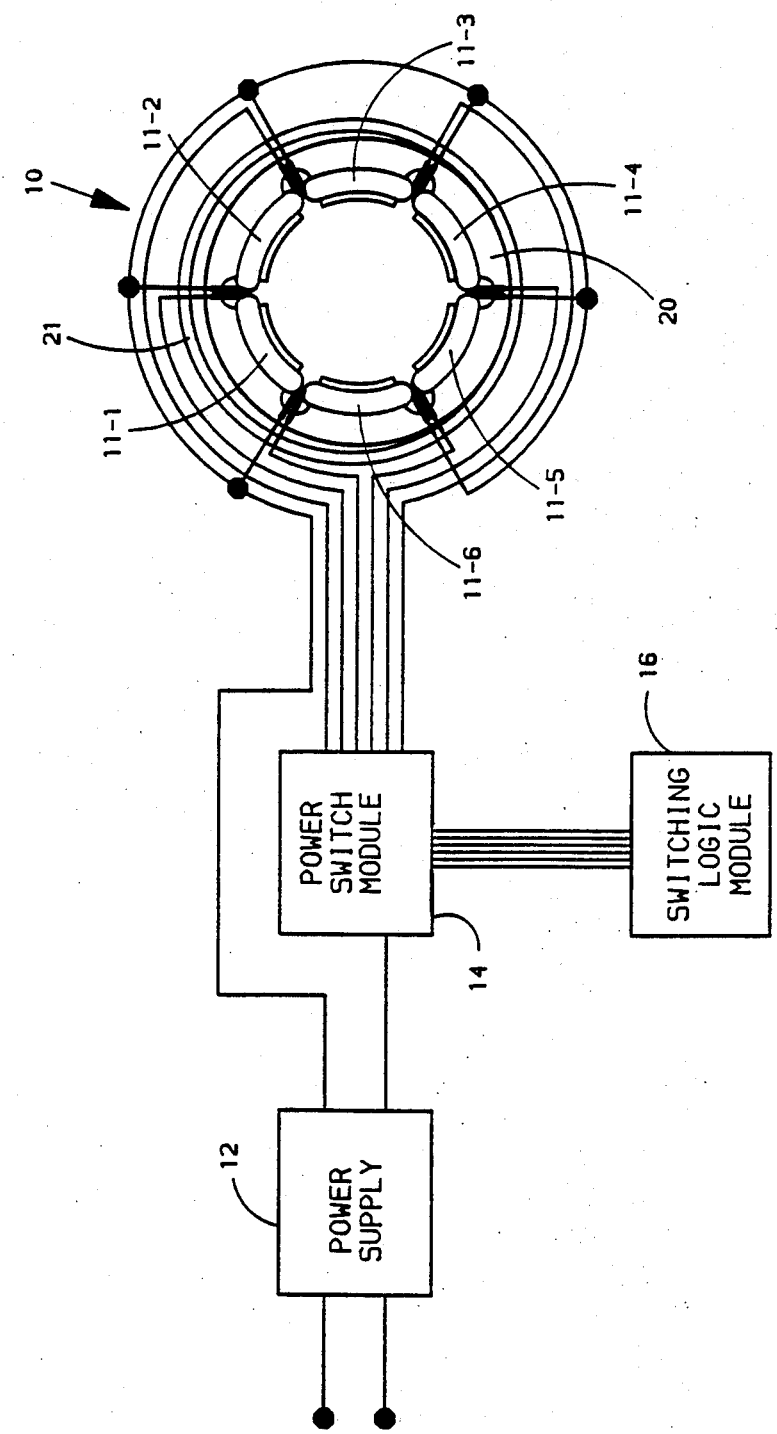
FIG. 1 is a circuit diagram for a rolling rotor motor.
Figure 2:
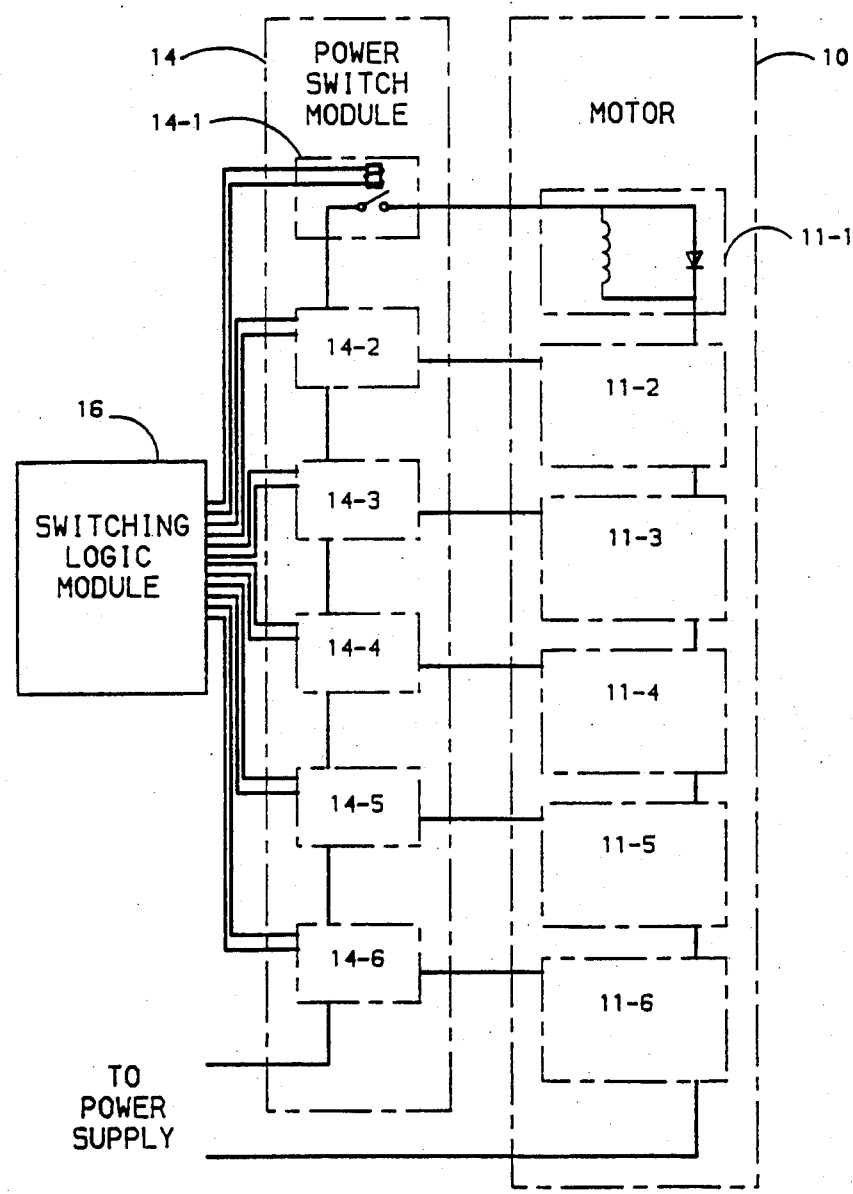
FIG. 2 is a more detailed view of the switching portion of the circuit of FIG. 1.
Figure 3:
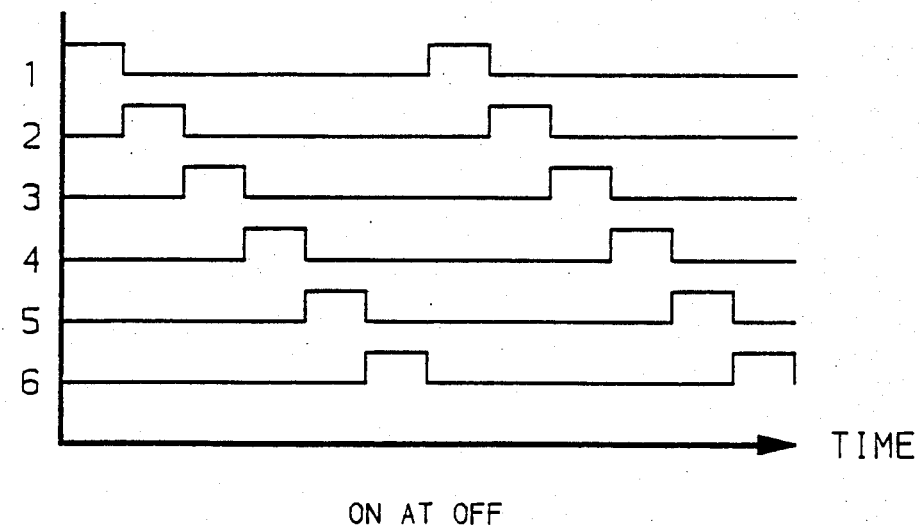
FIG. 3 is a graph showing the actuation of the switches as a function of time in the on at off mode.
Figure 4:
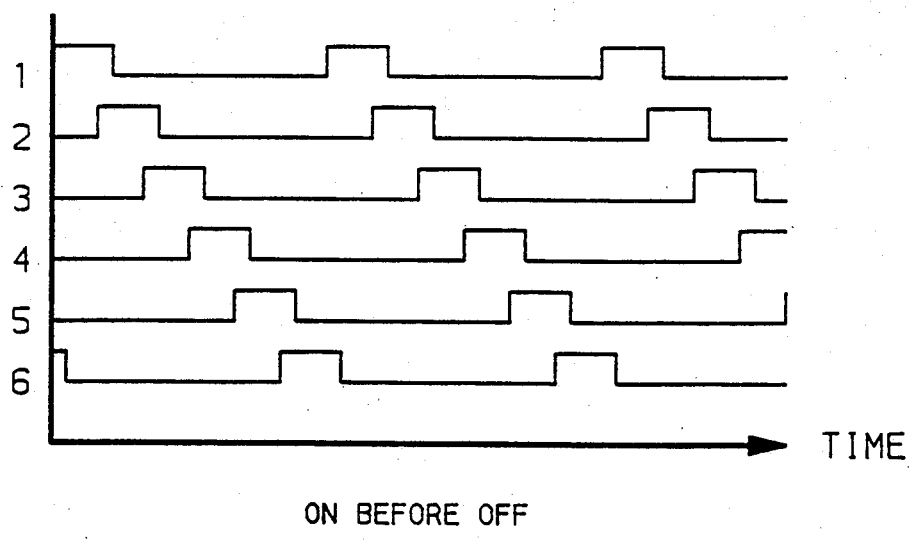
FIG. 4 is a graph showing the actuation of the switches as a function of time in the on before off mode.

In FIG. 1 the numeral 10 generally designates a rolling rotor motor which has a plurality of windings with six, 11-1 to 6, being illustrated. Power from power supply 12 is supplied to windings 11-1 t o 6 by power switch module 14 under the control of switching logic module 16. Referring to FIG. 2, it will be noted that the power supply 12 is connected to windings 11-1 to 6 through switches 14-1 to 6 which are controlled by switching logic module 16. Switch 14-1 is illustrated as solenoid actuated but any suitable power switching may be employed. Switches 14-1 to 6, as illustrated in FIG. 3, can be actuated in an "on at off" mode wherein the shutting off of power to one winding coincides with the supplying of power to the next winding. Alternatively, as illustrated in FIG. 4, switches 14-1 to 6 can be actuated in an "on before off" mode wherein power is supplied to a winding for a short period of time after power is supplied to the next winding.

Figure 5:
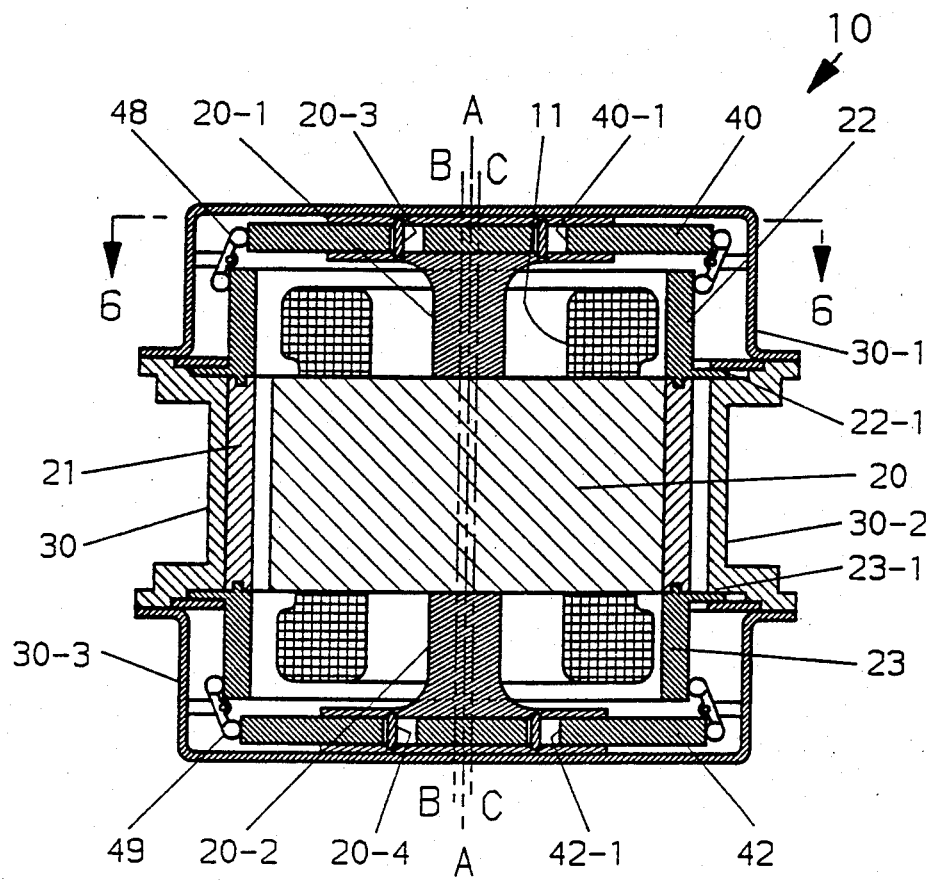
FIG. 5 is a vertical section of a rolling rotor motor taken along line 5—5 of FIG. 6.
Figure 6:
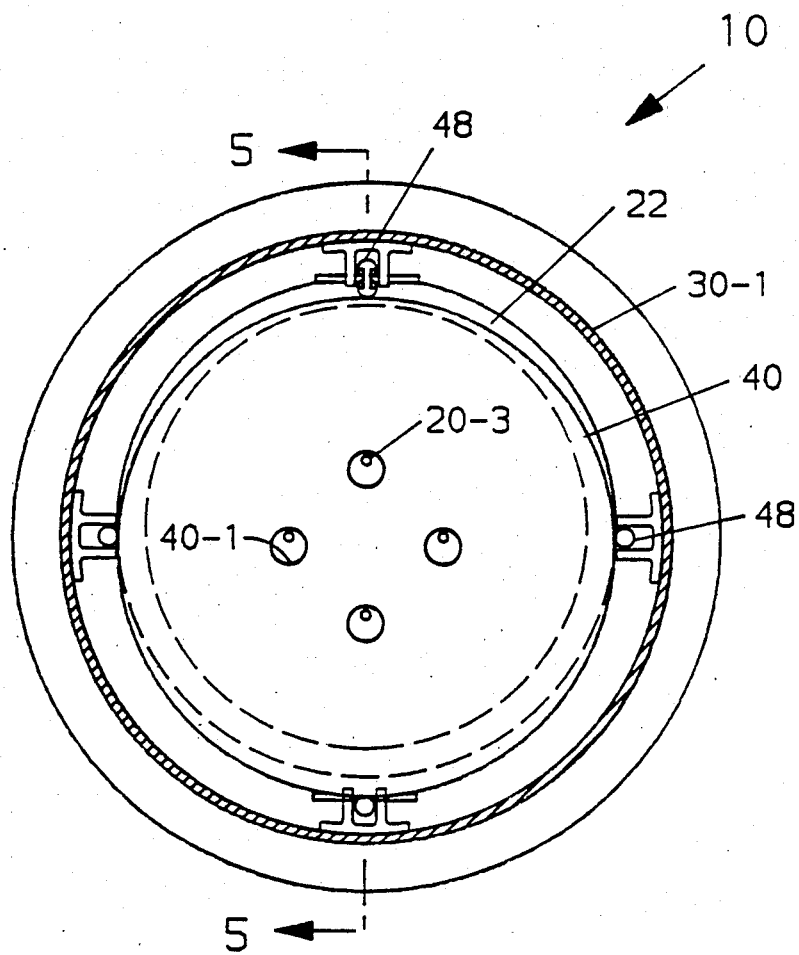
FIG. 6 is a horizontal section taken along line 6—6 of FIG. 5.

In FIGS. 5 and 6 the numeral 10 generally designates a rolling rotor motor which includes a stator 20 with windings 11 and an external annular rotor 21 surrounding stator 20. Motor 10 is located in a shell 30 made up of an upper section 30-1, a middle section 30-2 and a lower section 30-3 which are secured together in any suitable fashion such as by welding. Secured to the ends of rotor 21 are flanged annular extensions 22 and 23, respectively, which are movable with rotor 21 as a unit. Annular flanges 22-1 and 23-1 coact with shoulders on middle section 30-2 to axially support and position rotor 21 within shell 30.

Figure 7:
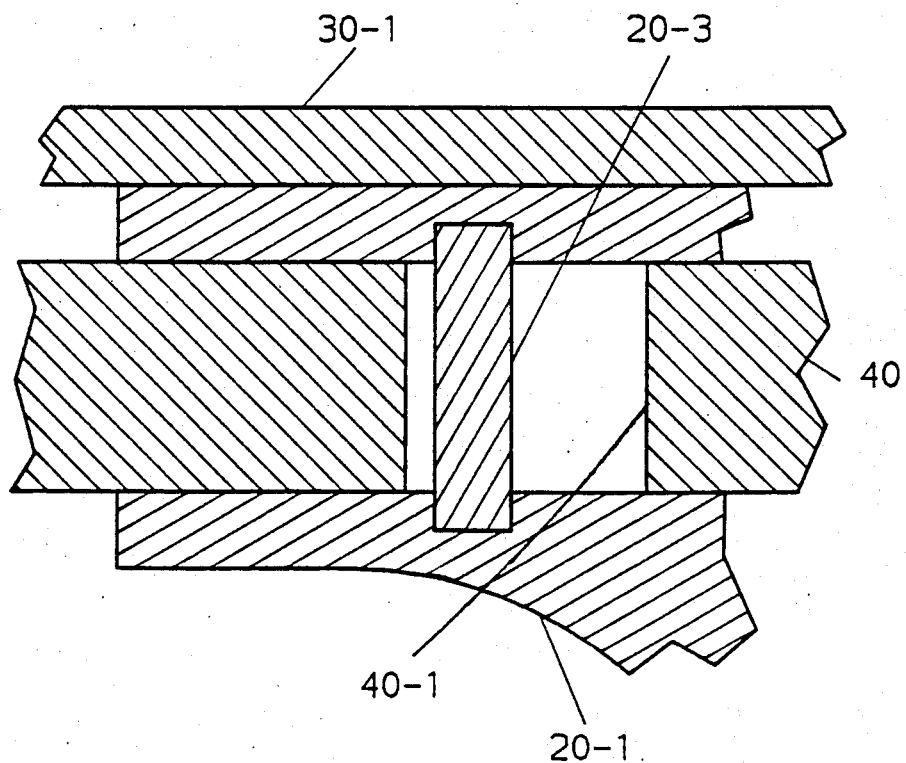
FIG. 7 is an enlarged view of a portion of FIG. 5.

Stator 20 has a pair of axial extensions 20-1 and 20-2, respectively which are suitably secured to shell 30, as by welding. Each of the axial extensions 20-1 and 20-2 has a section formed by a plurality of axial pins 20-3 and 20-4, respectively. Axial pins 20-3 extend through and coact with bores 40-1 in counterweight 40 in the nature of an anti-rotation device as is best shown in FIGS. 6 and 7.

Similarly, axial pins 20-4 extend through and coact with bores 42-1 in counterweight 42. A first series of circumferentially spaced pivoted links 48 are fixedly supported and pivoted with respect to shell 30 but each simultaneously engages both counterweight 40 and extension 22. Similarly, a second series of circumferentially spaced pivoted links 49 are fixedly supported and pivoted with respect to shell 30 but each simultaneously engages both counterweight 42 and extension 23. Thus, any movement of rotor 21 produces a movement of counterweights 40 and 42 through links 48 and 49. The combined mass of rotor 21 and extensions 22 and 23 will be equal to the combined mass of counterweights 40 and 42.

In operation, as the magnetic field moves about the stator 20 through the selective activation of some of the windings, as described above, annular rotor 21 tends to follow the magnetic field and coacts with the stator 20 in the manner of the coaction of the piston and cylinder of a rolling piston compressor. The annular rotor 21 thus tends to rotate about the stator 20 together with extensions 22 and 23. As extensions 22 and 23 move with the rotor 21, they act on links 48 and 49, respectively, causing counterweights 40 and 42 to be shifted so that they are 180° out of phase with rotor 21 and the center of gravity of the counterweights 40 and 42 represented by axis C—C is on the opposite side of the centerline A—A of stator 20 as the center of gravity of the integral member defined by rotor 21 and extensions 22 and 23 represented by axis B—B. Thus, the unit can be dynamically balanced with the correct selection or design of the counterweights 40 and 42 using standard moment of inertia equations to balance the rotor 21 and the associated extensions 22 and 23 with the counterweights 40 and 42. If the axis B—B of rotor 21 coincided with A—A, all of the links 48 and 49 would be parallel to A—A and B—B and counterweights 40 and 42 would not be out of phase with respect to rotor 21 and axis C—C would also coincide with A—A. Although rotor 21 and the attached extensions 22 and 23 are able to rotate about stator 20, counterweights 40 and 42 are held to orbiting motion. Specifically pins 20-3 coact with bores 40-1 and pins 20-4 coact with bores 42-1 such that counterweights 40 and 42 are held to an orbiting motion which has a diameter equal to the difference in diameter of pins 20-3 and 4 and holes 40-1 and 42-1. As extensions 22 and 23 move, they coact with links 48 and 49 which tend to maintain counterweights 40 and 42 180 out of phase with the rotor 21 to thereby provide a dynamic balance.

Although a preferred embodiment of the present invention has been illustrated and described, other changes will occur to those skilled in the art. It is therefore intended that the scope of the present invention is to be limited only by the scope of the appended claims.

What is claimed is:

1. A rolling rotor motor means comprising:
   housing means;
   stator means within said housing means and having an axis and a plurality of selectively activated windings;
   annular rotor means within said housing means and having a center of gravity and surrounding said stator means so as to coact therewith such that when some of said windings are activated said rotor means is in line contact with said stator means;
   counterweight means having a center of gravity and movably located within said housing means; and
   linkage means connecting said rotor means and said counterweight means such that said center of gravity of said rotor means and said center of gravity of said counterweight means are maintained 180 out of phase with respect to said axis of said stator means so as to provide a dynamic balance.

2. The rolling rotor motor means of claim 1 wherein said rotor means and said counterweight means have equal masses.

3. The rolling rotor motor means of claim 1 wherein said annular rotor means includes an annular rotor having a first and second end and axial extensions secured to said first and second ends and coacting with said linkage means.

4. The rolling rotor motor means of claim 1 wherein said counterweight means moves in an orbiting motion as said rotor means rotates.

5. The rolling rotor motor means of claim 1 wherein said linkage means includes a plurality of pivoted members engaging both said counterweight means and said rotor means such that said counterweight means and said rotor means move in symmetry with respect to said axis of said stator means.

6. A rolling rotor motor means comprising:
   housing means;
   counterweight means having a center of gravity and located within said housing means;
   stator means within said housing means and having an axis and a plurality of selectively activated windings and coacting with said counterweight means so as to permit movement of said counterweight means;
   annular rotor means within said housing means and having a center of gravity and surrounding said stator means so as to coact therewith such that when some of said windings are activated said rotor means is in line contact with said stator means; and
   linkage means connecting said rotor means and said counterweight means such that said center of gravity of said rotor means and said center of gravity of said counterweight means are maintained 180 out of phase with respect to said axis of said stator means so as to provide a dynamic balance.

7. The rolling rotor motor means of claim 6 wherein said rotor means and said counterweight means have equal masses.

8. The rolling rotor motor means of claim 6 wherein said annular rotor means includes an annular rotor having a first and second end and axial extensions secured to said first and second ends and coacting with said linkage means.

9. The rolling rotor motor means of claim 6 wherein said counterweight means moves in an orbiting motion as said rotor means rotates.

10. The rolling rotor motor means of claim 6 wherein said linkage means includes a plurality of pivoted members engaging both said counterweight means and said rotor means such that said counterweight means and said rotor means move in symmetry with respect to said axis of said stator means.

* * * * *